United States Patent [19] [11] 3,705,550
Long [45] Dec. 12, 1972

[54] SOLID ROCKET THRUST TERMINATION DEVICE

[72] Inventor: James A. Long, Wharton, N.J.

[73] Assignee: The United States of America as represented by the Secretary of the Army

[22] Filed: Nov. 2, 1970

[21] Appl. No.: 85,933

[52] U.S. Cl. ............................. 102/49.5, 60/254
[51] Int. Cl. .......................... F42b 15/10, A47f 3/04
[58] Field of Search ........ 102/49.4, 49.5; 60/35.6 RS, 60/254

[56] References Cited

UNITED STATES PATENTS

| 3,177,655 | 4/1965 | White | 102/49.5 |
| 3,143,965 | 8/1964 | LaPointe | 102/49.4 |
| 3,140,886 | 7/1964 | Cotilla et al. | 102/49.5 |
| 2,721,517 | 10/1955 | Workman | 102/49.4 |
| 3,122,098 | 2/1964 | Glennan | 60/254 X |
| 3,038,303 | 6/1962 | Gose | 60/254 |

Primary Examiner—Samuel Feinberg
Assistant Examiner—James M. Hanley
Attorney—Harry M. Saragovitz, Edward J. Kelly and Herbert Berl

[57] ABSTRACT

A thrust termination device for terminating solid rocket propellant thrust at a pre-selected point in the rocket trajectory responsive to a signal from an on-board sensing device, to actuate and move a restrainer element out of its blocking position in a resilient and tensioned split ring which thereupon concentrically collapses and compacts to free the rocket motor forward head portion for movement in a thus predictable path, and to enable the extinguishing of the projectile propellant and the termination of rocket thrust, to enable precise range pre-selection between the points of maximum attainable range and the minimum launch-associated range of the rocket.

4 Claims, 4 Drawing Figures

PATENTED DEC 12 1972 3,705,550

INVENTOR.
JAMES A. LONG
BY Harry M. Saragovitz
Edward J. Kelly &
Herbert Berl ATTORNEYS

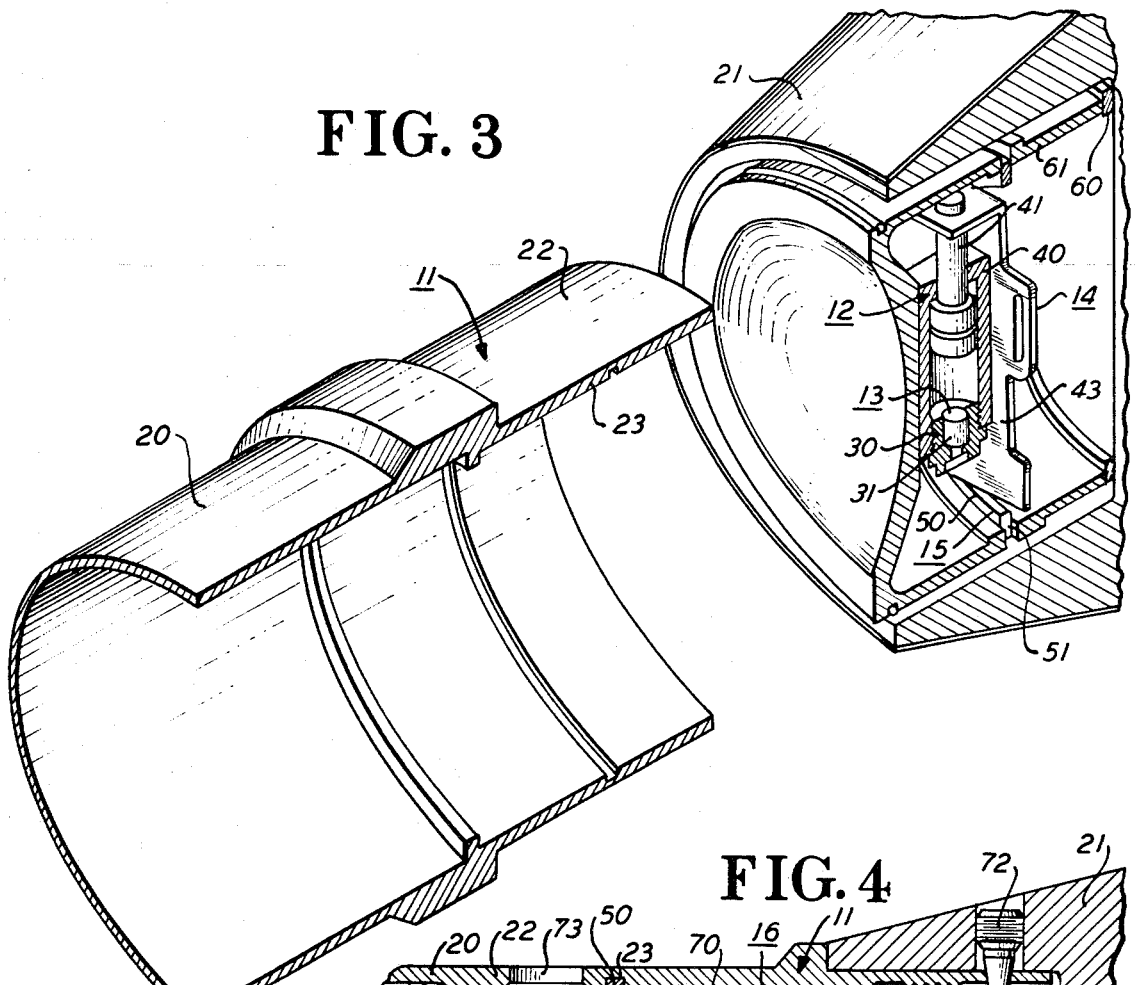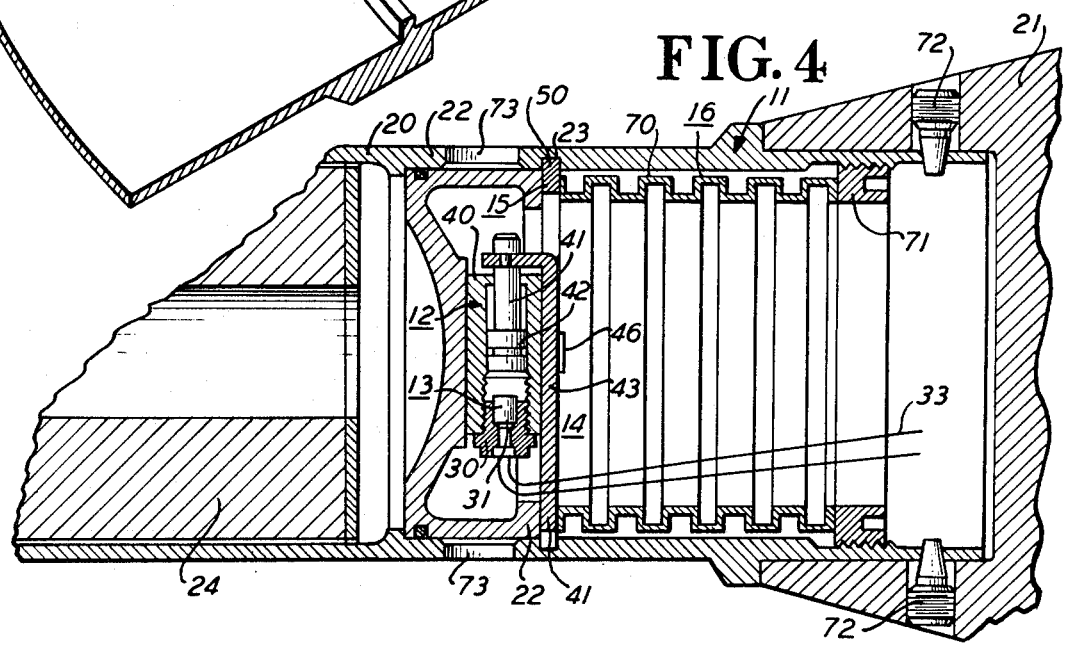

SOLID ROCKET THRUST TERMINATION DEVICE

The invention described herein may be manufactured, used and licensed by or for the Government for governmental purposes without the payment to me of any royalty thereon.

BACKGROUND OF INVENTION

This invention relates generally to rocket thrust control devices, and more specifically relates to a rocket thrust termination device, for use with a rocket propelled launch-assisted projectile, activated pursuant to a signal from an onboard sensing device at a pre-selected trajectory point, which makes possible the precise and accurate selection of range for such rocket propelled projectile launched from tube weapons such as mortars.

Pre-selection of range for projectiles fired from tube weapons has been accomplished heretofore in general by varying the amount of propellant charge used or the elevation of the launching tube. Neither of these methods is appropriate or useful in the launching of projectiles wherein most of the propelling energy of the projectile is embodied within the projectile itself, as in rocket propelled projectiles; in such devices, the greater portion of the projectile's impulse and thrust is imparted after the projectile leaves the launch tube. In large super-caliber warhead projectiles, in order to achieve the minimum velocity for projectile stability because of momentum restrictions, it is desirable and necessary to impart all possible energy within the launch tube. For such projectiles, reducing the propellant charge results in unacceptably low velocities; also, varying the launch tube elevation within the constraints of the weapon has little effect on the pre-selection range zoning. In some instances, thrust deflectors or spoilers may be assembled and added to the projectile to decrease the range; however, these devices severely penalize the accuracy of the round and are also logistically undesirable because a set of extra parts must be supplied with each round and must be selected and assembled in the field. The present invention may be built into the round and set before firing. It retains all the accuracy inherent in the projectile's design. Also, it permits the use of fixed launch conditions which can be pre-selected for optimum assembly, operation and accuracy.

Mortar launched supercaliber warhead projectiles were conceived to give infantry the capability to deploy large and heavy warhead systems, but it appeared that they would require additional new apparatus for launch and also would only be capable of limited range use. Standard mortar ammunition is light enough to attain sufficient muzzle velocity to achieve long range without imparting excessive recoil momentum to the mortar and without excessive breech pressure and may be range zoned by varying the breech charge to impart various muzzle velocities or by varying the breech mortar angle of elevation. The new and large heavy warhead projectiles contemplated would require very high breech pressure to attain a useful range and would also impart very high recoil momentum to the mortar, both of which would make a new and much heavier mortar weapon necessary. Even with the new weapon its range would be severely limited because the large diameter of the warhead carries a high aerodynamic drag penalty, degrading the velocity imparted by the mortar. The efficiency of such a system would be rather low. Adding a rocket assist to the projectile solved some of these problems. The breech pressure and recoil momentum could be brought down to levels compatible with the tolerable momentum and internal pressure limits of the existing mortar, and the resulting muzzle velocity would be adequate for initial stability of the rounds. Additional impulse provided by the rocket motor brought the velocity of the projectile up to the level required to attain the desired maximum range. The major problem remaining to be solved was that of pre-selected range zoning. Since the mortar's angle of elevation variation is limited and the maximum mortar breech pressure was being used to provide initial stability for the round, the only degree of freedom permissible was varying the impulse imparted by the rocket motor, i.e., terminating the thrust of the rocket motor when sufficient velocity has been imparted to the round to achieve the desired range. Thus, if the mortar elevation and the mortar propellant charge were kept constant, the basic weapon conditions would be simplified while at the same time if a method to terminate the rocket motor thrust at any given velocity could be devised the projectile could be preset to achieve any desired range.

Pursuant to the invention, such pre-selected range zoning for mortar launched supercaliber warhead projectiles is provided for by means of an on-board rocket thrust termination device which solves the above described problems and others, and which has numerous practical applications as will be apparent from the disclosure herein to those skilled in the art. A piston-restrainer element, interposed between the ends of a resilient split ring retainer which in turn is interposed between the warhead member and the rocket motor body member in retaining position, is actuated responsive to a signal from an onboard sensing device at a pre-selected range trajectory point, and said piston-restrainer is thereby moved out of such position to enable collapse of said retainer ring, thereby freeing the rocket motor body member for movement to cause the extinguishing of the projectile propellant, to thereby terminate the rocket thrust for precise range zoning. In one embodiment of the invention, the rocket motor body member is moved free from the warhead member pursuant to the operation of the rocket thrust termination device and separates therefrom, thereby terminating the range assist provided by the propellant and enabling trajectory preselection. In another embodiment of the invention, the rocket motor body member is moved free for movement against an impact absorbing element within the projectile to enable the onboard venting of the propellant to terminate same, to thereby terminate the range assist provided and to enable non-separation range pre-selection.

In accordance with the foregoing, it may be regarded as among the objects of the present invention to provide a novel rocket thrust termination device which is utilized to provide the extinguishing of rocket assist propellant pursuant to actuation and operation of a pre-selected onboard signalled terminating device to thereby enable pre-selected range zoning of mortar launched supercaliber warhead rocket-assist projectiles or other similar projectiles.

BRIEF DESCRIPTION OF DRAWINGS

The invention is diagrammatically illustrated, by way of example, in the appended drawings wherein similar reference characters indicate like parts, in which:

FIG. 3 is a perspective partly-sectional fragmentary rear view of the separation of the members in one embodiment of the invention; and FIG. 4 is an elevational partly-sectional fragmentary side view of another embodiment of the invention.

DESCRIPTION OF PREFERRED EMBODIMENTS

Figure 1:
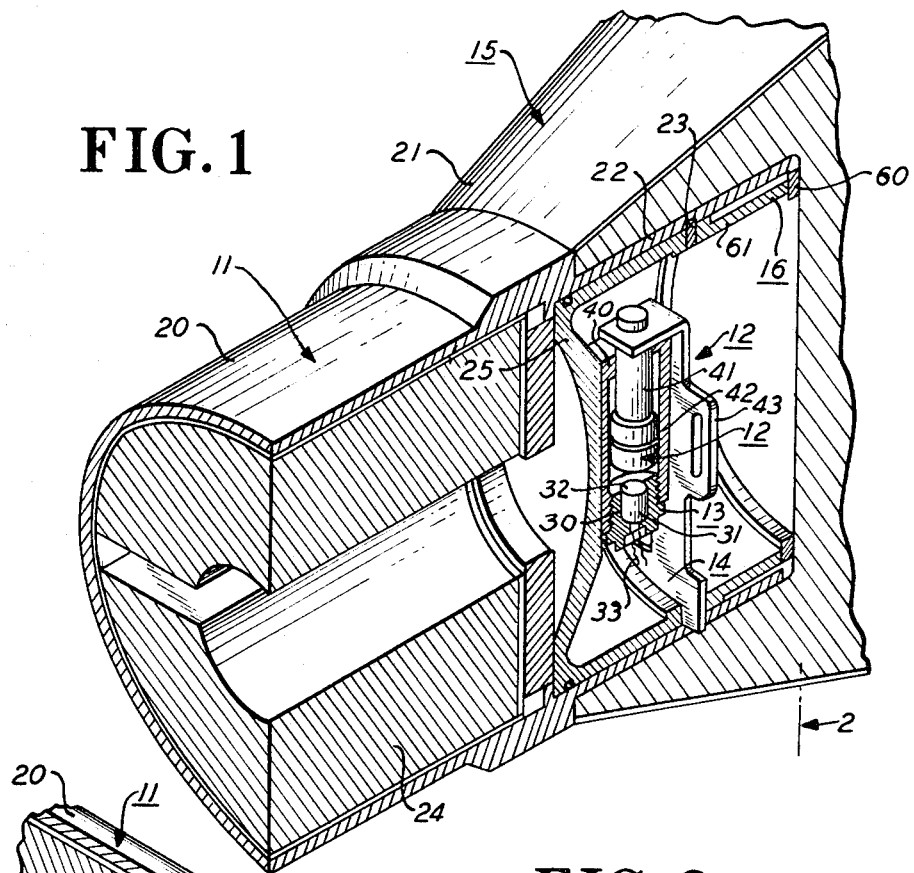
FIG. 1 is a perspective partly-sectional fragmentary rear view of a rocket propelled launch assisted projectile incorporating a thrust termination device embodying the invention therein.

In accordance with the preferred modes of practicing the invention, as shown in the drawings, in one embodiment of the invention the rocket thrust of a solid rocket propulsion system, for example, is extinguished by separating the forward bulkhead of the rocket motor from the warhead to thereby extinguish the propellant grain. An onboard sensing device, which senses when termination should be accomplished, actuates the mechanism. This sensing device may comprise, for example, a velocity sensing device which integrates acceleration and actuates the system at any pre-selected velocity, or it may comprise a timer preset to function at a selected time after launch, assuming that the relationship between time and velocity has been determined, or it may comprise another similar system. The propellant grain in this embodiment extinguishes immediately upon separation and the rocket motor will follow behind the warhead along a predicted path.

In another embodiment of the invention, the propellant grain is extinguished without separating the rocket motor from the warhead, or alternatively if the propellant could be made to burn in such a fashion as to not generate thrust, the same purpose is achieved. Therefore, in this embodiment the projectile incorporates the thrust termination device so as to permit the rocket motor head to travel forward within an adapter which secures the rocket motor body to the warhead. A cushioning device absorbs the forward momentum of the rocket motor body to prevent damage to the warhead. When the rocket motor body moves forward, it uncovers ports in the adapter through which the rocket motor gases are suddenly vented, thereby extinguishing the propellant grain. This embodiment would be useful if the projectile is to be flown over the head of friendly troops, in which instance if separation were to occur as in the other previously described embodiment, the separated parts might prove hazardous to our own forces.

In a first embodiment of the invention (FIGS. 1–3) the rocket-propelled launch assisted projectile 11 comprises a motor body member 20, warhead member 21, motor forward head portion 22, motor forward head groove 23, and propellant 24 therein. The thrust termination device 12 positioned in thrust terminator housing 25, comprises, for example, actuation means 13, spacer means 14, retention means 15, and cushioning means 16.

The actuation means 13 (FIG. 1) for example, is comprised of an actuator housing 30, squib member 31 with charge 32 therein positioned in said housing, and lead wires 33 extending therefrom which are connected to an onboard sensing device (not shown).

Figure 2:
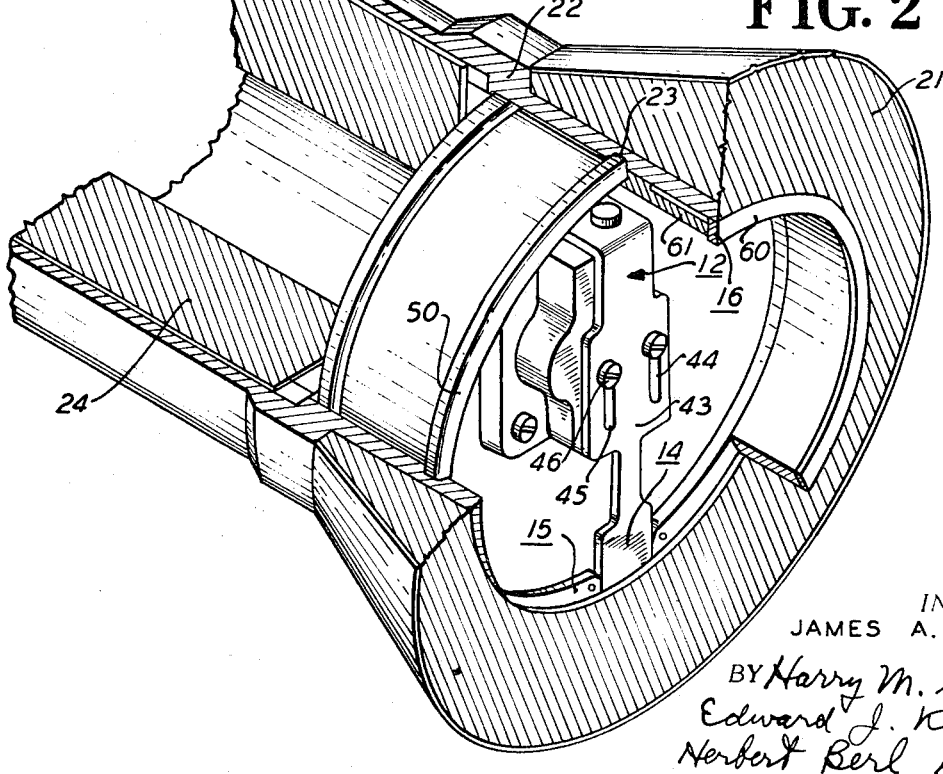
FIG. 2 is a perspective partly-sectional fragmentary front view of the device pursuant to the invention taken on line 1—1 of FIG. 1.

The spacer means 14 (FIG. 1) comprises, for example, piston housing 40, piston 41 located therewith, locking pin 42 in engagement therewith (FIG. 4), spacer release slide member 43 extending thereabout with piston movement guide means 44 thereon which comprises, for example, slots 45 and bolts 46 (FIG. 2).

The retention means 15 (FIGS. 1, 2 & 3) for example, comprises a retainer ring member 50, with leading ring edges 51; the cushioning means 16 comprises cushioning gasket 60 and spacer ring 61 interposed between the motor forward head portion 22 and the warhead member 21.

In another embodiment of the invention (FIG. 4), an impact absorber shield 70 which is interposed between the thrust terminator housing 25 and the warhead member 21 which are affixed together by fixing means 72 and venting apertures 73, are located at surface positions on motor forward head portion 22 for venting of said propellant 24.

In operation, in a first embodiment (FIGS. 1–3) for example, the squib member 31 housed in the actuator housing 30 is fired on actuation of the charge 32 by a sensing device (not shown) interconnected therewith through lead wires 33. The squib member 31, on ignition pursuant to the signal from the sensing device causes pressure to build up against the face of piston 41 in piston housing 40. This force on the piston 41 shears locking pin 42 and causes the piston 41 to move in a generally upward direction, restrained in its path of movement by piston movement guide means 44 which is located on spacer release slide member 43 which is affixed for movement with the piston 41. The bottom portion of spacer release slide member fits in wedging position between the split ends of retainer ring member 50, maintaining the ring member 50 in an expanded position in motor forward head groove 23, thereby retaining the motor body member 20 and warhead member 21 during firing of the propellant 24. When the pre-selected point of thrust termination is reached, the firing of the piston 41 pulls the spacer release slide member 43 from between the ends of the retainer ring member 50 enabling the ring member 50 to collapse under its own spring tension plus the compressive load on it from the motor head portion. The leading edge of the retainer ring member 50 may be chamfered so that it collapses concentrically and will not hang up. Upon collapse of the retainer ring member 50, the pressure from inside the rocket motor acting in sequence on the thrust terminator housing 25, the retainer ring member 50, and cushioning gasket 60 and spacer ring 61 against the warhead member 21 separates these components from the motor body member 20 leaving the warhead member 21 in free flight (FIG. 3). The motor forward head portion 22 experiences a momentary reverse thrust from the opening at the head end facilitating the separation from the forward section, and the propellant grain 24 snuffs out from the rapid drop in pressure.

The thrust termination is accomplished without separation of the rocket motor in another embodiment of the invention, shown in FIG. 4. In operation in this alternate embodiment, the squib member 31 housed in actuator housing 30 is fired by a signal from a preset on-board sensing device (not shown) signalled through lead wires 33 igniting the charge 32. On ignition of the squib member 31, pressure is built up against the face of piston 41 in piston housing 40. This force on the piston 41 shears locking pin 42 and causes the piston to move in a generally upward direction, restrained in its movement by piston movement guide means 44 on spacer release slide member 43 which is affixed for movement with piston 41. The bottom portion of a spacer release slide member 43 is edged between the split ends of retainer ring member 50, thereby restraining the ring member 50 in place by wedging it in an expanded position in motor forward head groove 23 in the motor body, thereby restraining the motor body member 20 and warhead member 21 during firing of the propellant grain 24. When the pre-selected point of thrust termination is reached, the firing of the piston 41 pulls the spacer release slide member 43 from between the ends of retainer ring member 50 causing the retaining ring 50 to collapse under its own spring tension plus the compressive load on it from the thrust terminator housing 25. The leading edge of the retainer ring member 50 is chamfered so that it collapses concentrically and will not hang up. At this point the pressure from inside the rocket motor acting in sequence on the thrust terminator housing 25, the retainer ring member 50, and the impact absorber shield 70, which is maintained in position by the impact absorber retainer 71, with the warhead member 21 affixed to the motor body member 20 by fixing means 72, allows the thrust terminator housing 25 to move forward, crushing the impact absorber shield 70 against the impact absorber retainer 71. The movement of the motor forward head uncovers venting apertures 73 in the body which vents the gases from the propellant grain 24. The rapid venting rapidly lowers the pressure in the motor and snuffs out the propellant grain thus terminating thrust.

While the present invention has been particularly set forth in terms of specific embodiments thereof, it will be evident in view of the instant disclosure, that numerous variations upon the invention are now enabled to those skilled in the art, which variations in propriety are yet within the true scope of this teaching. Accordingly, the invention is to be broadly construed, and limited only by the scope and spirit of the claims now appended hereto.

I claim:

1. A thrust termination device, for terminating rocket thrust pursuant to a signal from an onboard sensing device, located in a thrust terminator housing, in a rocket propelled launch assisted projectile which comprises a motor body member and a warhead member, comprising:
   a. termination means, to enable thrust termination at a signalled point of trajectory, comprising
      i. retention means which includes, a spring tensioned retainer split ring member extending into a groove in the motor forward head portion and therewith said motor body member in engagement with the warhead member in thrusted projectile flight, and
      ii. spacer means which includes a piston housing, a piston in said housing, a spacer release slide member affixed to said piston for movement therewith, piston movement guide means interconnected to said piston for guidance thereof, and a locking pin frangibly connecting said piston to said piston housing, and which in a non-actuated position serves to maintain said retention means in engagement position.
   b. actuation means which includes, an actuator housing, a squib member positioned in said housing with a charge therein, with lead wires extending therefrom to said onboard sensing device, and which actuates said termination means upon a signal from said onboard sensing device to move said spacer means, out of engagement position with respect to said retention means, releasing same for movement out of engagement with said motor forward body portion groove to enable said motor body member to move so as to vent said propellant gases to terminate thrust thereby, and
   c. cushioning means interposed between said warhead member and said motor body member to cushion relative movement of said members on thrust termination.

2. In a thrust termination device, as set forth in claim 1, said cushioning means comprising a cushioning gasket and a spacer ring.

3. In a thrust termination device, as set forth in claim 2, said cushioning means comprising an impact absorber shield, and an impact absorber retainer.

4. In a thrust termination device, as set forth in claim 3, fixing means securing said warhead member and said motor body member together.

* * * * *